3,634,246
LUBRICANT COMPOSITIONS
George J. Quaal, Midland, Mich., assignor to Dow
Corning Corporation, Midland, Mich.
No Drawing. Filed Mar. 13, 1969, Ser. No. 807,115
Int. Cl. C10m 3/40, 3/46
U.S. Cl. 252—49.9          9 Claims

ABSTRACT OF THE DISCLOSURE

Lubricant compositions containing a major amount of triaryl phosphate and a minor amount of a silicone polymer containing at least 40 mole percent phenylsiloxane units are disclosed. Exemplary is a blend of 60 volume percent tricresylphosphate and 40 volume percent of a 50-50 copolymer of dimethylsiloxane units and phenylmethylsiloxane units.

---

This invention relates to improved lubricant compositions. In one aspect the invention relates to triaryl phosphate-polysiloxane blends. In another aspect, the invention relates to an improved hydraulic fluid.

Tertiary phosphate esters have found increasing commercial utility as lubricants and hydraulic fluids. Trialkyl phosphates have been used as anti-seize additives for polydimethylsiloxane lubricants. Although the diaryl and triaryl phosphates are generally considered insoluble in silicone fluids, mixtures of tricresylphosphate, aromatic hydrocarbon solvent and a silicone polymer have been disclosed as penetrating oils—see U.S. Pat. 2,467,178. Another patent, U.S. 2,618,600, discloses that the insolubility of monoalkyldiaryl phosphates in silicone oils can be overcome by the addition of a trialkyl phosphate which functions as a solubilizing agent. At the present all silicon lubricants which contain a triaryl phosphate additive also contain a solubilizing agent or solvent.

Applicant has found that certain silicone polymers are completely soluble in certain triaryl phosphates and thus is able to form blends of such material which are solvent and solubilizer-free.

It is an object of the invention to provide solvent and solubilizer-free lubricants of a triaryl phosphate-silicone blend.

It is another object of the invention to provide an improved hydraulic fluid.

These and other objects of the invention will be apparent to one skilled in the art upon consideration of the specification and appended claims.

According to the invention, there is provided a fluid composition consisting essentially of (a) 60 to 95 parts by volume of a tertiary phosphate ester of the general formula $(RO)_3P=O$, in which R is a phenyl or alkaryl radical, no more than two phenyl radicals being present; and (b) 5 to 40 parts by volume of a fluid organopolysiloxane containing at least 40 mole percent of units of the formula $$\begin{array}{c} R' \\ | \\ SiO \\ | \\ Ph \end{array}$$

in which Ph is the phenyl radical and R' is selected from the group consisting of lower alkyl, phenyl and perfluoroalkylethyl radicals of no more than 12 carbon atoms, any remaining units being of the formula $$Z_aSiO_{\frac{4-a}{2}}$$

in which Z is the hydroxyl group, a monovalent hydrocarbon radical or monovalent halohydrocarbon radical and $a$ has a value of 2 or 3.

As described above, the phosphate includes

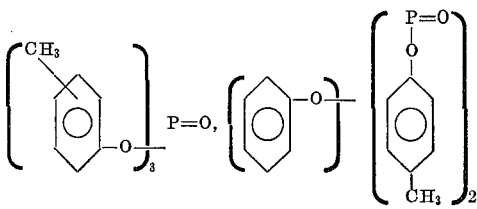

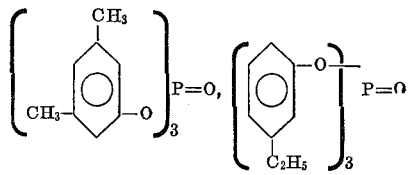

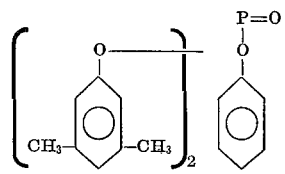

and the like.

The polysiloxane, which is compatible with the defined phosphate esters must contain at least 40 mole percent phenylsiloxy units, which include methylphenylsiloxy, ethylphenylsiloxy, hexylphenylsiloxy and diphenylsiloxy units. Perfluoroalkylethyl substituents of no more than 12 carbon atoms can also be present on the phenylsiloxv unit. The perfluoroalkylethyl radicals include $CF_3(CH_2)_2-$, $C_2F_5(CH_2)_2-$, $C_3F_7CH_2CH_2-$ and so on through to $C_{10}F_{21}CH_2CH_2-$.

The $$ZaSiO_{\frac{4-a}{2}}$$

units of the polymer include units in which Z is a monovalent hydrocarbon radical such as alkyl radicals, for example methyl, ethyl, isopropyl, hexyl and octadecyl; aliphatically unsaturated radicals, for example, vinyl, allyl, ethynyl, butadienyl and 4-hexenyl; and aryl-containing radicals, for example phenyl, tolyl, xenyl, naphthyl, benzyl and 2-phenylpropyl. Z can also be any monovalent halohydrocarbon radical, such as 3,3,3-trifluoropropyl, chloropropyl, bromohexyl chloroallyl, dibromophenyl, chlorophenyl, $\alpha\alpha\alpha$-trifluorotolyl and chloroxenyl.

The preferred organopolysiloxanes for use in forming the lubricating compositions of the invention are phenylmethylpolysiloxanes and phenylmethylsiloxane-dimethylsiloxane copolymers. The organopolysiloxanes can be either linear or cyclic polymers. For example, the cyclic hexamer of phenylmethylsiloxane units can be utilized as the component (b).

The above defined composition is a homogeneous blend; the phosphate and organopolysiloxane are completely compatible. This is in contrast to materials beyond the scope of the defined invention, for example, tricresylphosphate is insoluble in polydimethylsiloxane and tris-(6-chloro-O-tolyl) phosphate is only slightly soluble in a 50-50 copolymer of phenylmethylsiloxane and dimethylsiloxane units. The compositions of the invention have excellent lubricity and low flammability, and are non-corrosive. The compositions are suitable for use as lubricants and because of their low degree of compressibility, they are especially suitable as hydraulic fluids. The compositions have a wide range of viscosiyt depending upon the viscosity of the two components. For general use as a lubricant, a viscosity of 100 to 10,000 cs. at 77° F. is suitable. The compositions which are intended for use as hydraulic fluids generally have a viscosity in the range of from 20 to 200 cs. at 77° F.

It is also within the scope of the invention to provide grease compositions which utilize the phosphatepolysiloxane blends as a base fluids. The grease comprises a mixture of the fluid compositions of the invention and a grease-forming quantity of a thickening agent. A variety of conventional thickening agents can be used. These thickening or gelling agents, metal salts or soaps, i.e. lithium stearate, which are dispersed in the base fluid in grease forming quantities, in such a degree as to form a grease of the desired stiffness or consistency. Other thickening agents which can be utilized in the grease formulation include the non-soap thickeners, surface modified clays and silicas, aryl ureas, oleophilic graphite, polytetrafluoroethylene, calcium complexes, and the like.

In general, grease thickeners are employed which do not melt or dissolve when used at the required temperature in a specific environment; however, within this limitation, any material which is normally used as a thickener or gelling agent in grease formulations can be used in preparing grease in accordance with the present invention.

The following examples are illustrative of the invention which is delineated in the claims.

EXAMPLE 1

Thirty-five parts by volume of a 50—50 copolymer of dimethylsiloxane phenylmethylsiloxane units having a viscosity of 100 cs. at 77° F. were mixed with sixty-five parts by volume of a commercially available cresyldiphenyl phosphate having a viscosity of 36 cs. at 77° F. to form a first composition. The mixture was agitated until a clear solution was obtained at room temperature.

A second composition was formed by mixing 35 parts by volume of phenylmethylpolysiloxane having a viscosity of 500 cs. at 77° F. with 65 parts by volume of tricresylphosphate having a viscosity of 58 cs. at 77° F.

The properties of the compositions are given below:

|  | Composition No. 1 | Composition No. 2 |
|---|---|---|
| Specific gravity | 1.147 | 1.145 |
| Refractive index | 1.537 | 1.547 |
| Surface tension (dyne/cm.) | 28 | 31 |
| Viscosity at 77° F. (cs.) | 54.7 | 107 |
| Viscosity index | 125 | 110 |
| Compressibility at 20,000 p.s.i. (percent) | 4.94 | 4.68 |
| Pour Point (° F.) | −25 | −21 |
| Flash Point (° F.) | 460 | 460 |
| Fire Point (° F.) | 635 | 655 |
| Percent weight loss—after 250 hrs. at 350° F. | 71 | 75 |

The lubrication properties of the above compositions were determined by the 4-Ball method on a Roxanna wear testing machine. In this test, a ½ inch steel ball is rotated against three stationary ½ inch steel balls at a rate of 1200 r.p.m. at temperature of 400° F. under a load of 20 kilograms for 30 minutes. At the end of this time, the length and width of the scar formed on each stationary ball is measured and the average of the six measurements is taken as the wear scar diameter. The smaller the wear scar, the better the lubricant. Both compositions, when used as lubricants in the 4-Ball test, resulted in wear scar diameters of 0.55 millimeters, showing them to be excellent lubricants.

EXAMPLE 2

Various amounts of different types of thickeners were mixed with phenylmethylsiloxane-tricresylphosphate composition (No. 2) described in Example 1 to form grease compositions. The materials were mixed on a 3-roll mill until intimate mixtures of the filler and base fluid were obtained. The following greases were formulated:

Grease A:
  48.3 weight percent polytetrafluoroethylene
  51.7 weight percent Composition No. 2—Example 1
Grease B:
  25.0 weight percent silica
  75.0 weight percent Composition No. 2—Example 1
Grease C:
  38.8 weight percent lithium stearate
  61.2 weight percent Composition No. 2—Example 1
Grease D:
  41.7 weight percent graphite
  58.3 weight percent Composition No. 2—Example 1

The thickening agent is generally added in an amount ranging from 15 to 60 weight percent of the total mixture. The thickeners utilized in the above formulations are commercially available materials.

The grease properties were determined and are listed below.

| Grease | Penetration | | | Dropping point (° F.) | Percent evaporation 22 hrs./ 400° F. | Percent bleed 30 hrs./ 300° F. |
|---|---|---|---|---|---|---|
| | Off-mill | Unworked | Worked | | | |
| A | 294 | 297 | 297 | 468 | 0.5 | 2.7 |
| B | 294 | 286 | 294 | 482 | 0.8 | Nil |
| C | 286 | 301 | 301 | 470 | 1.5 | 8.6 |
| D | 290 | 286 | 294 | 482 | 0.8 | 2.6 |

These physical properties demonstrate the suitability of the compositions of the invention as base fluids for grease formulations.

Reasonable modification and variation are within the scope of the invention, which is directed to novel lubricants.

That which is claimed is:

1. A fluid composition consisting essentially of
  (a) 60 to 95 parts by volume of a phosphate ester of the general formula $(RO)_3P{=}O$ in which each R is independently selected from the group consisting of the phenyl radical and alkaryl radicals of no more than 8 carbon atoms; no more than two of the R groups being phenyl radicals; and
  (b) 5 to 40 parts by volume of a fluid organopolysiloxane containing at least 40 mol percent of units of the formula

in which Ph is a phenyl radical; and R' is selected from the group consisting of lower alkyl radicals, the phenyl radical or beta-perfluoroalkylethyl radicals of no more than 12 carbon atoms; any remaining units being of the formula

in which Z is the hydroxyl group, a monovalent hydrocarbon radical or a monovalent halohydrocarbon radical, and $a$ has a value of 2 or 3.

2. The fluid of claim 1 wherein the phosphate is tricresyl phosphate.

3. The fluid composition of claim 1 wherein the organopolysiloxane is a phenylmethylpolysiloxane.

4. The fluid composition of claim 1 wherein the organopolysiloxane is a copolymer of phenylmethylsiloxane and dimethylsiloxane units.

5. The fluid composition of claim 1 wherein the phosphate is a cresyldiphenyl phosphate and the organopolysiloxane is a phenylmethylsiloxane-dimethylsiloxane copolymer containing about 50 mol percent of phenylmethylsiloxane units.

6. The fluid composition of claim 1 wherein the phosphate is tricresyl phosphate and the organopolysiloxane is a phenylmethyl siloxane polymer.

7. A grease comprising a mixture of
(1) a fluid composition consisting of
  (a) 60 to 95 parts by volume of a phosphate ester of the general formula $(RO)_3P=O$ in which each R is independently selected from the group consisting of the phenyl radical and alkaryl radicals of no more than 8 carbon atoms; no more than two of the R groups being phenyl radicals; and
  (b) 5 to 40 parts by volume of a fluid organopolysiloxane containing at least 40 mol percent of units of the formula

in which Ph is a phenyl radical; and R' is selected from the group consisting of lower alkyl radicals, the phenyl radical or beta-perfluoroalkylethyl radicals of no more than 12 carbon atoms; any remaining units being of the formula

in which Z is the hydroxyl group, a monovalent hydrocarbon radical or a monovalent halohydrocarbon radical, and $a$ has a value of 2 or 3; and
(2) a grease forming quantity of a thickening agent.

8. The grease of claim 7 wherein the fluid component (a) is tricresyl phosphate.

9. The grease of claim 8 wherein the fluid component (b) is phenylmethylpolysiloxane.

References Cited
UNITED STATES PATENTS

| | | | |
|---|---|---|---|
| 2,467,178 | 4/1949 | Zimmer et al. | 252—49.6 |
| 2,618,600 | 11/1952 | Moreton | 252—49.9 |
| 2,850,797 | 9/1958 | Chambers et al. | 252—28 |
| 2,860,104 | 11/1958 | Peterson et al. | 252—28 |
| 2,877,182 | 3/1959 | May | 252—28 |
| 2,984,624 | 5/1961 | Halter et al. | 252—28 |
| 3,314,889 | 4/1967 | Christian | 52—49.6 |
| 3,479,290 | 11/1969 | Brown | 252—49.6 |

DANIEL F. WYMAN, Primary Examiner

I. VAUGHN, Assistant Examiner

U.S. Cl. X.R.

252—28, 29, 42.1, 49.6, 49.8, 78